United States Patent [19]

Andrews

[11] 4,362,474
[45] Dec. 7, 1982

[54] CENTRIFUGAL FUEL PUMP WITH AUTOMATICALLY SWITCHED JET INJECTION

[75] Inventor: Merritt B. Andrews, Westfield, Mass.

[73] Assignee: United Technologies Corp., Hartford, Conn.

[21] Appl. No.: 105,685

[22] Filed: Dec. 20, 1979

[51] Int. Cl.³ .............................. F04B 23/14
[52] U.S. Cl. .................. 417/80; 60/39.28 R; 417/89
[58] Field of Search ............ 417/80, 83, 85, 87, 417/89, 244, 245

[56] References Cited

U.S. PATENT DOCUMENTS 3,319,569  5/1967  Norris et al. ..................... 417/80
3,532,441  10/1970  Schofield ......................... 417/89 X

FOREIGN PATENT DOCUMENTS 262920  12/1926  United Kingdom .............. 417/80

Primary Examiner—Carlton R. Croyle
Assistant Examiner—Edward Look
Attorney, Agent, or Firm—Robert E. Greenstien

[57] ABSTRACT

A centrifugal pump for pumping fuel to a gas turbine engine is equipped with a start injector and a run injector. The pump has a single fuel output nozzle from which fuel goes to the engine. It also has several other nozzles from which fuel goes to the start injector. The flow through the injector draws fuel from the engine fuel supply and raises the pressure on a pump inlet, thereby raising the pressure in the pump outlet nozzle. The run injector receives bypass fuel flow from the engine and uses it to draw in engine fuel which is supplied together with the bypass fuel to a pump inlet nozzle. The run injector increases the fuel pressure in that inlet. The start injector operates during starting and the run injector is inoperative at that time. When the engine speed reaches a minimum level for sustained engine operation, the start injector is inoperative and the run injector is operating.

4 Claims, 5 Drawing Figures

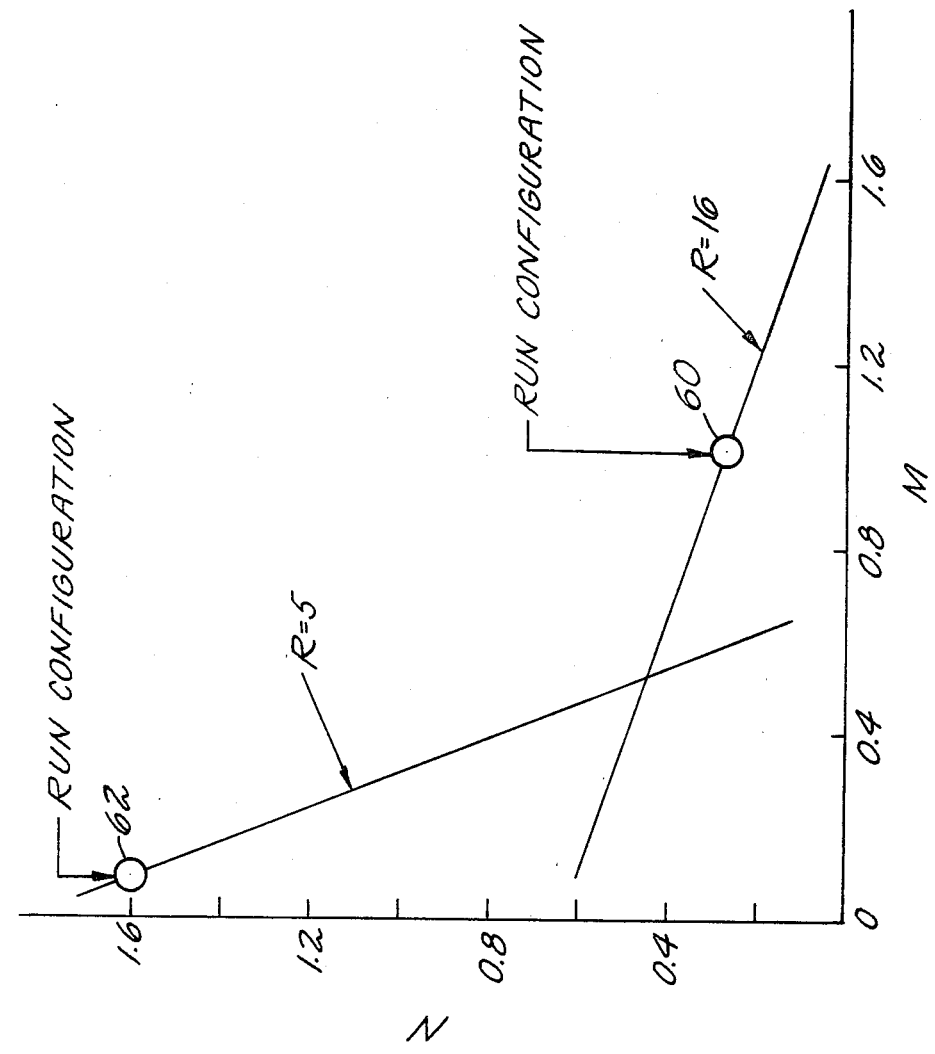

CENTRIFUGAL FUEL PUMP WITH AUTOMATICALLY SWITCHED JET INJECTION

DESCRIPTION

1. Technical Field

This invention relates to centrifugal fuel pumps.

2. Background Art

A centrifugal pump, which is basically a vane or a rotor that is rotated in a ported manifold, has a useful characteristic: pump pressure increases in proportion to the square of the rotor speed ($R.P.M.^2$). Centrifugal pumps which are operated at a high speed therefore provide considerable size, weight and cost savings compared to positive displacement pumps.

In starting a gas turbine engine ignition should occur at the lowest possible engine speed in order to minimize starting power consumption and starter size. Owing to this a centrifugal pump which is designed by conventional criteria to provide adequate fuel pressure to produce proper fuel injection for ignition at low rotor speed would have excessive pressure at normal speeds, and would therefore generate excessive heat and power losses at those speeds. Hence, a centrifugal pump designed to satisfy starting parameters negates the benefits of a centrifugal fuel pump, simply because the pump must be oversized in order to provide adequate pressure during starting. This is one reason why centrifugal pumps are not used in gas turbine engines.

Another reason arises from the pumping problems encountered at high altitudes and in warm weather. As altitude (and temperature) increases, the atmospheric pressure approaches the fuel vapor pressure and the vapor-liquid ratio (V/L) increases. But, in order for a pump to draw fluid from a tank the pump inlet pressure must be lower than the tank pressure and consequently the vapor-liquid ratio in the inlet of a pump increases. The main problem with a low vapor-liquid ratio is that it causes cavitation, which results from the implosion of the vapor in the high pressure side of the pump and may progressively damage the pump, especially in a centrifugal pump having high rotor speeds. This is a particular obstacle to the use, in high altitude aircraft, of a small, compact fuel control system centered on using a high speed (high pressure) centrifugal pump to produce proper fuel flow.

Pump inlet pressure may be increased by using jet injection techniques, as described, for instance, in the text by A. J. Stepanoff, *Centrifugal and Axial Flow Pumps, Theory, Design and Application* (1948). These techniques have been used for some time for injecting water into high pressure steam boilers, and they simply involve diverting part of the pump output flow through an injector apparatus which consists of a nozzle and throat. Pump output is reduced by this diverted flow, however. The flow between the nozzle and throat draws water into the throat where the pressure is increased as a result of the conversion of velocity pressure into static pressure from the flow deceleration that occurs in the throat. By using similar techniques fuel pressure in the inlet of a centrifugal pump may be raised to decrease the vapor-liquid ratio. Even so, a pump which is designed to provide maximum flow at 100% engine speed at sea level and which uses jet injection at high altitude to avoid cavitation, still does not have the capability to provide adequate fuel pressure to permit engine starting at low engine speed; thus it must be oversized for that purpose.

Obviously, it is possible to use complex, expensive transmission techniques and schemes to provide variable pump speeds so that a high pump speed can be developed at low engine speeds, in order to provide the necessary minimum fuel pressure for engine starting, and so that pump speed can be slowed at high altitudes (also at high temperatures), where less fuel flow is required.

DISCLOSURE OF INVENTION

The present invention permits design of a centrifugal pump which is no larger than necessary to provide maximum fuel flow but provides greater pressure at low speeds than a similarly sized conventional centrifugal pump and inlet pressure boost under conditions where vapor-liquid ratios are low.

In accordance with the present invention a jet injection system, which automatically switches between necessary injection modes, is used with a high speed centrifugal pump to provide a centrifugal pump system in which adequate nozzle pressure is established at low starting speeds and pump inlet pressure is raised to a level at which vapor-liquid ratio is acceptable.

The invention takes advantage of the fact that at a high altitude and on hot days less fuel is necessary to operate an engine at full speed, and as a result, in a gas turbine fuel control system, for example, fuel is bypassed. That bypassed fuel flow thus represents an excessive fuel flow capacity in the pump, which a pump according to the present invention utilizes for jet injection to raise the pump inlet pressure.

The invention also focuses on the fact that a centrifugal pump which is sized as small as possible for normal engine running operation under normal conditions on the ground is unable to generate enough pressure at a low engine starting speed to provide proper atomization of the fuel for ignition. The invention utilizes the available flow under those conditions to raise the pressure on the inlet during starting. This is accomplished by a second mode of jet injection during engine starting.

Thus, in a pump according to the present invention, pump operation is automatically switched, depending on pump flow, between at least two modes of jet injection where one mode is utilized to modify the operation of the pump during starting in order to raise pump pressure and the other is used in high altitude running conditions to raise inlet pressure. This injection involves using jet injectors whose nozzles are sized to provide the maximum possible pressure boost at the lowest available pump speed in order to bring the pump pressure up to a satisfactory level, as early as possible, so that proper fuel atomization is established as quickly as possible while the engine is started, so that ignition takes place at the lowest practical engine speed. The high altitude, run injection utilizes a different ratio, one which is intended to provide a pressure boost at the inlet when the pump speed is high and the pump is thereby producing its maximum pressure.

A feature of the invention is that it is equally applicable to fuel pumps for other engines, such as fuel injected automobiles where development of adequate pressure during starting is required and where excess pump capacity may exist due to environmental conditions, such as high altitude operation and warm weather. In such applications it is naturally desirable to utilize as small a pump as possible to achieve savings in size, weight and complexity.

Another feature of the present invention is that it provides a small, high speed centrifugal pump system; one which is typically as small as possible yet provides the necessary low R.P.M. fuel flow requirements for starting and for sufficient pump inlet pressure to avoid undesirable vapor-liquid ratios in the pump inlet. A particular quality of the present invention is that it utilizes, to advantage, those operating limitations which heretofore have presented an obstacle to the use of a conventionally designed centrifugal fuel pump in gas turbine engines, as well as other engines operated under similar ambient conditions.

BRIEF DESCRIPTION OF DRAWINGS

FIG. 5 is a graph containing straight line approximations of head (N) and capacity (M) characteristics of a centrifugal pump that is configured, according to the present invention, in order to provide exemplary pump operating characteristics.

BEST MODE FOR CARRYING OUT THE INVENTION

Figure 1:
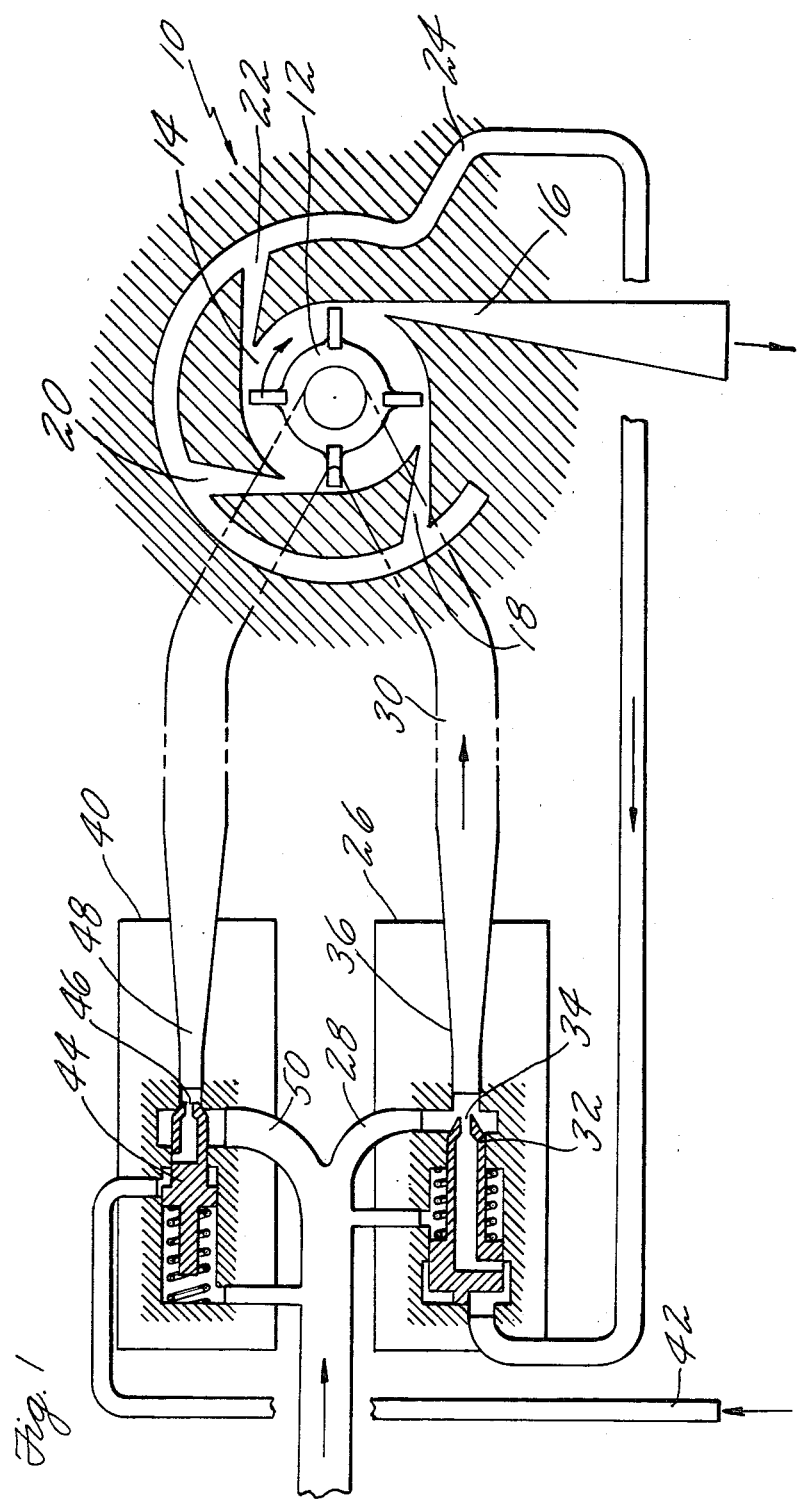
FIG. 1 is a schematic diagram of a centrifugal fuel pump which embodies the present invention; the pump is in the "start" mode.

In FIG. 1 a centrifugal pump system 8 embodying the present invention is shown. The system is in the start mode and includes a pump 10 which contains a vane or rotor 12. This vane is housed in a manifold 13 where it is rotated in a direction 14 at a speed that increases in proportion to the speed of a gas turbine engine (not shown) having a fuel control (not shown) to which fuel is pumped from a main pump outlet (nozzle) 16. Three other outlets (nozzles) 18, 20 and 22 are connected, over a line 24, to a start injector apparatus 26. This injector apparatus 26 receives a fuel flow QE over a line 28, at a pressure PA (ambient pressure), from a supply (a tank, for example). The injector mixes the flow QE with a fuel flow QS which is pumped at a pressure PS over the line 24 that is connected to and supplied from the outlets 18, 20, 22.

The ports 18, 20 and 22 produce an extremely high flow QS during engine startup and this flow is used to raise the pressure on the inlet 30. If, for example, all the inlets 16, 18, 20, 22 are assumed to have the same area, then during startup the fuel flow through the outlet 16 will be one-third of the total flow in the line 24. The injector 26 supplies a total fuel flow QS+QE to a pump inlet 30 through which the fuel flows to the pump rotor 12. The start injector 26 includes a movable start valve member 32 which is biased in the open position during the starting mode configuration. Fuel in the line 24 flows through a port 31 in the valve member to an integral nozzle 34 having an opening with an area A1. From this nozzle the fuel flows into an injector throat 36 which has an area A2. This throat connects with the line 28. The high velocity, low static pressure fuel flow between the nozzle 34 and the throat 36 draws fuel from the line 28, where the static pressure is higher. The fuel flow QS through the nozzle 34 is the flow which is circulated around the pump. The fuel which is drawn into the flow QS forms the flow QE which is supplied to the engine from the pump outlet 16. The valve member 32 is biased open by a spring 37, and as the fuel pressure in the line 24 increases (with rotor speed), the valve progressively closes and reduces the flow to the inlet 30. Once the engine is at running speed, the valve is completely closed.

Figure 2:
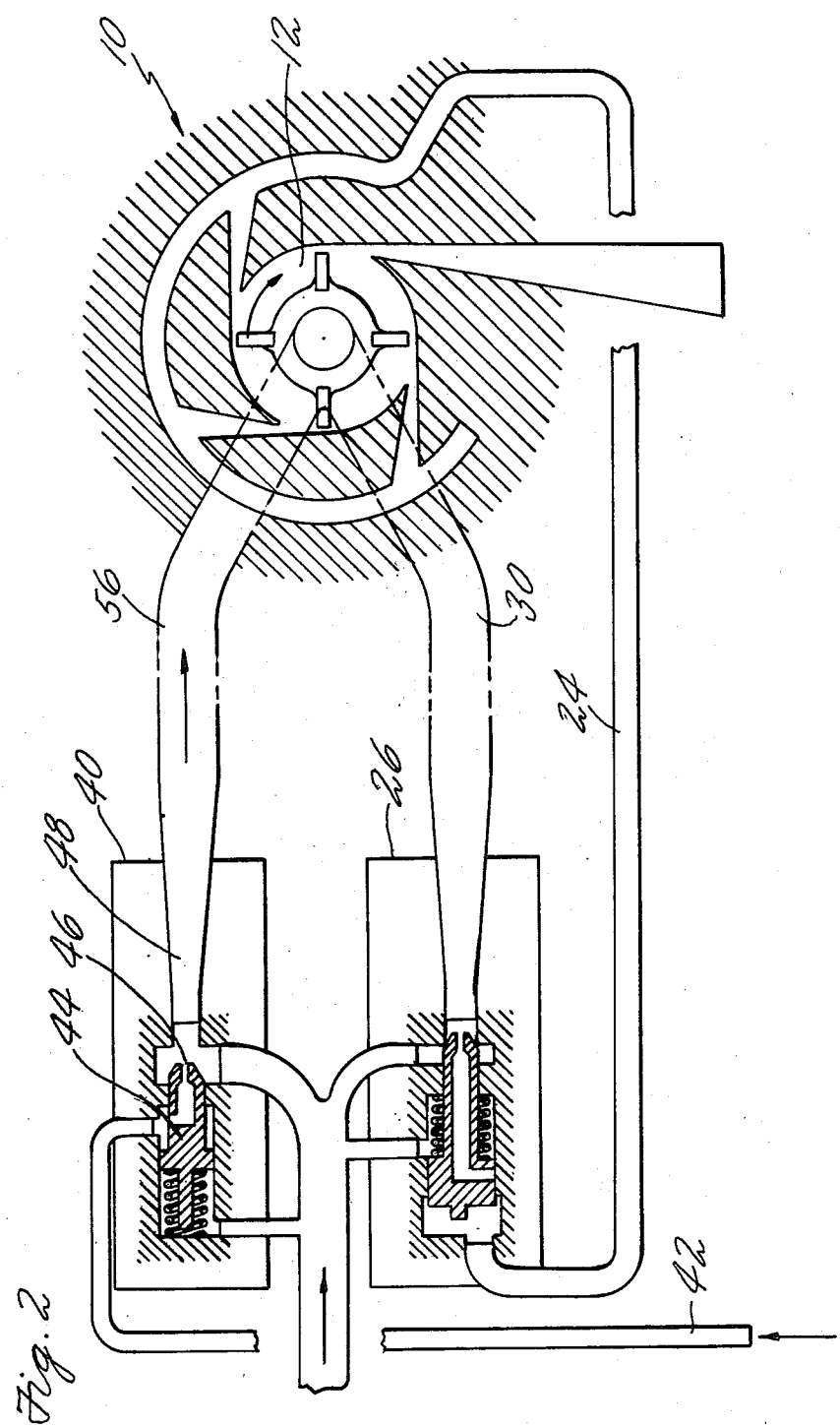
FIG. 2 is a schematic diagram which shows the fuel pump in FIG. 1 in the "run" mode.

A run injector assembly 40 receives bypass fuel from the engine over a line 42. This is the fuel which is not consumed by the engine and is bypassed by the hydro-mechanical fuel control. This injector assembly 40 includes a spring loaded valve member 44. This member is biased in a closed position by a spring 45 during the start mode configuration (FIG. 1), but once the engine is at running speed the bypass pressure increases and moves the member to the open position as shown in FIG. 2. The valve member 44 includes an integral nozzle 46 which has an area B1. When the valve member is in the open position, fuel is ejected from this nozzle into a throat 48 which has an area B2. The nozzle and throat provide supercharging, by means of jet injection, during the run mode. The resultant flow QR through the nozzle 46 draws the engine fuel flow QE from the line 50 and the mixture QR+QE flows through the throat 48 and into a second pump inlet 56 which connects to the rotor 14.

Figure 3:
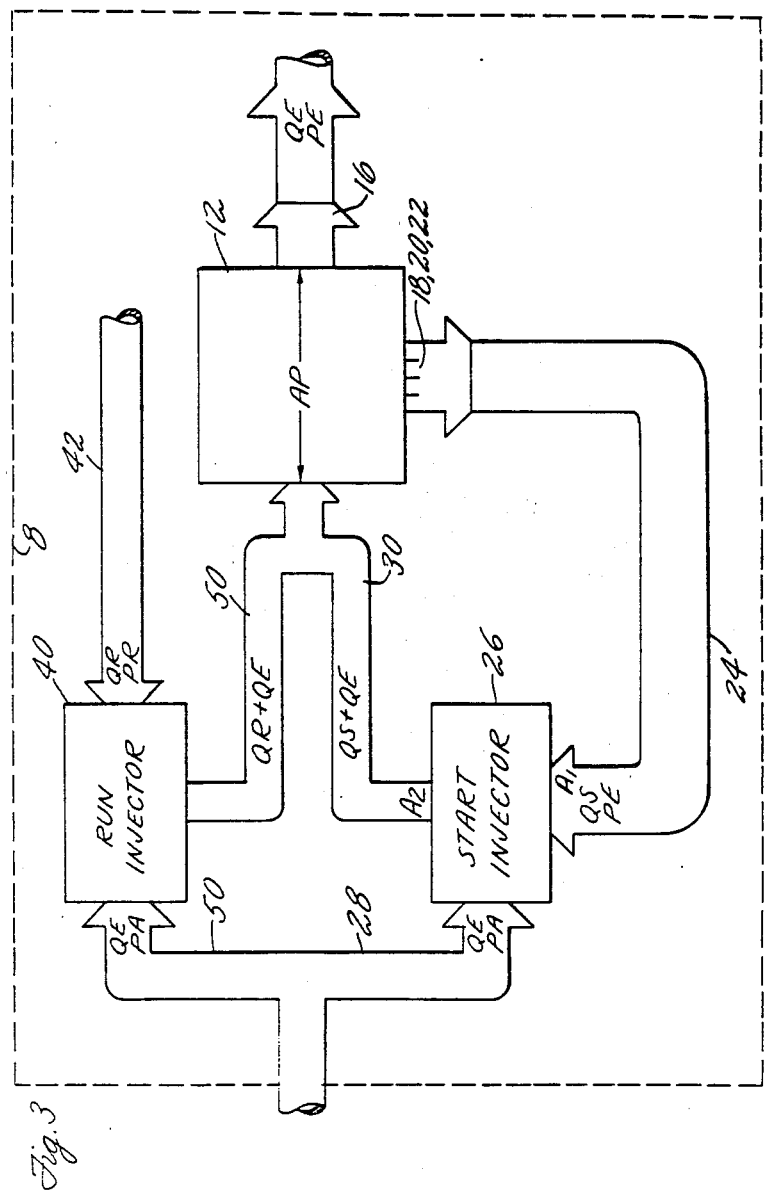
FIG. 3 is a functional block diagram of a fuel pump according to the teachings of the present invention.

The following example will illustrate the design of a pump according to the present invention to meet specific flow and pressure requirements for a hypothetical jet engine. Referring to FIG. 3 assume that the pump 12 is designed to produce a pressure lift or head P of 20 p.s.i. between the inlet 30 and pump outlet 16 at engine starting speed. Further assume a pressure in the fuel supply line of 14 p.s.i. and that the pump should provide a fuel flow QE to the engine of 40 p.p.h. at a pressure PE of 66 p.s.i. By subtracting P from PE the required pressure P2 in the inlet 30 is 46 p.s.i. From the equation:

$$N = (P2 - PA)/(PE - P2) \quad (1)$$

the head ratio N for this pump is approximately 1.6.

FIG. 5 is a graph which shows the relationship between M and N for different nozzle/throat ratios R where:

$$R = A1/A3. \quad (2)$$

This graph is derived from a similar one appearing in FIG. 18.5, page 406 in the previously cited text by Stepanoff where it is provided as a representation of actual results that were obtained for a jet injection water pump. Those results are equally applicable to other jet injection systems. In FIG. 5 a ratio N of 1.6 lies on only one ratio line, the line R−0.5. The capacity ratio at that point on the line R=0.5 is approximately 0.1, and using:

$$M = QS/QE \quad (3)$$

the pump flow required is approximately 400 p.p.h.

Figure 4:
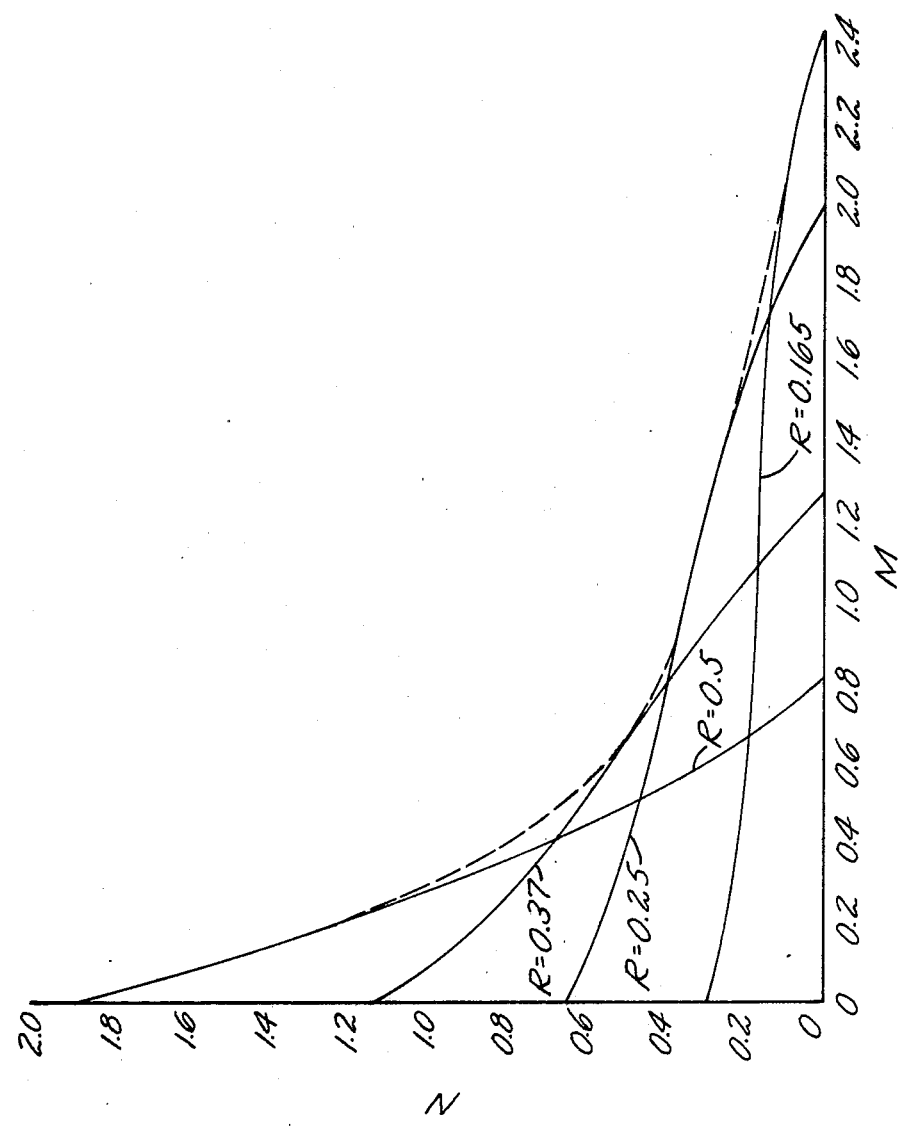
FIG. 4 is a graph illustrating the relationship between ratio area (R), pump head ratio (N) and capacity ratio (M) for a jet injection pump.

The parameters for the run injector 40 are calculated in a similar manner but disregarding the start injector flow in the line 30 since that flow is not present when the engine is running. Assume these following conditions. The tank pressure PA is 4 p.s.i. which corresponds roughly to the pressure at the altitude of 35,000 feet. An inlet pressure P1 of at least 7 p.s.i. is required to minimize cavitation in the pump. Through experimentation that pressure fuel has been found to be satisfactory for providing a reasonably safe vapor ratio (V/L) of at least 0.5. For this pump configuration that experimentation has also shown that the maximum pump flow QE+QR should not exceed 600 p.p.h. Additionally, assume that the pump is being operated at its maximum speed, which occurs with maximum engine speed and the output pressure PE is regulated by a pressure regulator in a fuel control so as not to exceed 76 p.s.i. Pressure regulation of that type is well known in the fuel control art. From the equation:

$$N=(P1-PA)/(PE-P1) \qquad (4)$$

the head ratio N is approximately 0.2. At an altitude such as 35,000 feet roughly 45% less fuel is utilized by the engine and if the maximum inlet pump flow is limited to 600 p.p.h. at full pump speed, then QE is approximately 330 p.p.h. and QR is approximately 270 p.p.h. From the equation capacity ratio M:

$$M=QR/QE \qquad (5)$$

the capacity ratio is thus approximately 0.85. The head ratio N=0.2 and capacity ratio M=0.85 are the coordinates of a point which intersect several ratio lines in FIG. 4. The proper ratio line is selected by considering the capacity and head ratios at sea level and altitude and required pump efficiency. As R increases, there is a great deal of recirculating flow in the pump to provide a significant increase in pump pressure. As a result of that, the pump can be operated efficiently only if it is used to supply a fuel output having a very narrow range. Conversely, if R decreases, a smaller portion of fuel is recirculated, but the pump can be operated efficiently to provide a fuel output which has a much greater range. Considering the fact that the fuel actually supplied to the aircraft engine decreases by as much as 45% in altitude, the most efficient pump operation is obtained by using the curve R=0.16 which using $$R=B1/B2 \qquad (6)$$

established the required relationship between the nozzle and throat areas in the run injector 40.

FIG. 5 contains straight line approximations of the two ratio lines established by the start and run injectors for this exemplary pump. When the engine is started, the pump system 8 operates at the point 62 and as pump speed increases, the operating point moves down the line R=0.5 until the run injector begins to open when the start injector begins to close. The system operating point then moves along the line R=0.16 and the actual operating point depends on engine operation. For instance, at an altitude of 35,000 feet and maximum fuel flow to the engine the pump operates at the point 60. The coordinates of that point are the head ratio N and capacity ratio M computed previously.

Two separate injectors have been shown for exemplary purposes, but since the invention resides in providing switchable ratio injection, it is conceivably possible to provide a one variable ratio injector adapted to switch between two (or more) ratios, one for engine starting and the other for running, to achieve the overall pump response provided by the example discussed previously. Similarly, there may be other ways to provide the start flow that is used with the start injector, and it may be better to use more or less ports in the pump, depending upon particular applications. Yet, other modifications and variations in and to this particular embodiment may be made by one skilled in the art without departing from the true scope and spirit of the invention embodied therein.

I claim:

1. A fuel pump for supplying fuel from a fuel supply to an engine that has a fuel inlet and a bypass fuel flow outlet, characterized by:

a centrifugal pump having a centrifugal pump inlet, a primary centrifugal pump outlet for providing a primary fuel flow to the engine fuel inlet, and a secondary centrifugal pump outlet for providing secondary fuel flow at a flow rate that is greater than the primary fuel flow rate at any given pump speed, and a jet injector system connected to the fuel supply, the bypass fuel flow outlet and said secondary centrifugal pump outlet, through which fuel is supplied to the centrifugal pump inlet from the fuel supply in separately controlled mixtures of excess fuel flow and said secondary fuel flow to increase the fuel pressure in said primary outlet inversely with primary flow pressure below a certain primary flow pressure and increase fuel pressure in the centrifugal pump inlet in proportion to the pressure in the bypass outlet, said jet injector system comprising first and second injector fuel flow circuits for connection to the supply and through which fuel is supplied to the centrifugal pump inlet, the flow through each of these circuits being controlled by a corresponding jet injector assembly, each assembly including a throat connected to the centrifugal pump inlet and a movable injector nozzle for throttling the flow in the throat; one of said jet injector assemblies being connected to the centrifugal pump secondary outlet for mixing said secondary flow with fuel supplied to the centrifugal pump inlet and being controllable, in relation to the fuel pressure in said secondary outlet, to provide progressively less fuel from the fuel supply as the fuel pressure in said secondary pump outlet increases, and a second of said jet injector assemblies being connected to the engine excess flow outlet for providing a mixture of bypass fuel flow and fuel from said fuel supply, and being controllable, in relation to the pressure in said bypass fuel outlet, to provide progressively more fuel to the centrifugal pump inlet as the pressure in said excess fuel flow outlet decreases.

2. A fuel pump according to claim 1, characterized in that:

said centrifugal pump has a rotor which pumps fuel from the centrifugal pump inlet to a plurality of internal outlets; one of said outlets being connected to said primary centrifugal pump outlet; the remaining outlets being connected to said secondary centrifugal pump outlet.

3. A pump for supplying liquid from a liquid supply to a device having an inlet and excess flow bypass outlet, characterized by:

a centrifugal pump having a centrifugal pump inlet, a primary centrifugal pump outlet for providing a primary liquid flow to the inlet, and a secondary centrifugal pump outlet for providing secondary flow at a flow rate that is greater than the primary flow rate at any given pump speed, and a jet injector system connected to the supply, the bypass flow outlet and said secondary centrifugal pump outlet, through which liquid is supplied to the centrifugal pump inlet from the supply in separately controlled mixtures of excess flow and said secondary flow to increase the pressure in said primary outlet with the primary flow pressure below a certain primary flow pressure and increase pressure in the centrifugal pump in proportion to the pressure in the bypass fuel outlet, said jet injector system comprising first and second injector liquid flow circuits for connection to the supply through which liquid is supplied to the centrifugal pump inlet, the flow through each of these circuits being controlled by a corresponding jet injector assembly, each assembly including a throat connected to the centrifugal pump inlet and a movable injector nozzle for throttling the liquid flow in the throat; one of said jet injector assemblies being connected to the centrifugal pump secondary outlet for mixing said secondary flow with liquid supplied to the centrifugal pump inlet and being controllable, in relation to the fuel pressure in said secondary outlet, to provide progressively less liquid from the supply as the pressure in said secondary pump outlet increases, and a second of said jet injector assemblies being connected to the bypass flow outlet for providing a mixture of the bypass flow and liquid from the supply, and being controllable, in relation to the pressure in the bypass outlet, to provide progressively more liquid to the centrifugal pump inlet as the pressure in said excess fuel flow outlet decreases.

4. A pump according to claim 3, characterized in that:
said centrifugal pump has a rotor which pumps liquid from the centrifugal pump inlet to a plurality of internal outlets; one of said outlets being connected to said primary centrifugal pump outlet; the remaining outlets being connected to said secondary centrifugal pump outlet.

* * * * *